United States Patent Office 3,202,629
Patented Aug. 24, 1965

3,202,629
CROSS-LINKED COMPOSITION OF POLYETHYLENE WITH PIGMENT OF THE GROUP CONSISTING OF LITHOPONE AND ANTIMONY OXIDE
Ting Hung Ling, Marion, Ind., assignor, by mesne assignments, to Anaconda Wire and Cable Company, a corporation of Delaware
No Drawing. Filed Apr. 17, 1959, Ser. No. 806,996
3 Claims. (Cl. 260—41)

This invention relates to cross-linked polyethylene compositions and to a process for manufacturing these compositions. More particularly, this invention relates to such compositions in which the polyethylene chains are cross-linked with themselves and with lithopone or antimony oxide (or both), these compositions being characterized by substantial thermal stability at 260° C. The invention further contemplates the provision of an electric wire or cable comprising a conductor surrounded and insulated by such composition.

It has been known for some time that the physical properties of polyethylene may be modified by inducing cross-linking of the polyethylene chains with each other. Polyethylene which has been so modified has an appreciably higher softening point than ordinary polyethylene.

I have found that when free radicals are generated within an intimate mixture of polyethylene with a pigment of the group consisting of lithopone and antimony oxide, cross-linking of the polyethylene both with itself and with the particles of the pigment is caused to take place. The resulting cross-linked composition is characterized by having substantial thermal stability at temperatures up to 260°C. and other good mechanical and electrical properties. For example, it has been found to have good ozone and moisture resistance, good aging characteristics, and good corona resistance. Moreover, these compositions are white in color, so they may conveniently be colored by the addition of any suitable coloring matter. These polyethylene compositions, therefore, are particularly useful as insulating material in the manufacture of electric wires and cables, though their utility is not limited to this field.

The generation of free radicals within a polyethylene-pigment mixture prepared according to this invention may be accomplished by incorporating in it a free radical generator and heating the mixture to above the decomposition temperature of such generator, or by subjecting the mixture to high energy gamma or neutron radiation.

Generally, cross-linking by chemical means is preferred, i.e. by incorporating a free radical generator in the mixture of polyethylene and lithopone or antimony oxide and then applying heat to cure the mixture. Any free radical generator which decomposes at the desired curing temperature to generate free radicals may be employed to effectuate cross-linking (cure) of the composition. Organic peroxide free radical generators are especially effective. Examples of these organic peroxides are benzoyl peroxide, lauroyl peroxide, diethylene peroxide, diisopropyl benzene peroxide, di-tertiary butyl peroxide, bis(α-methylbenzyl) peroxide, benzyl-(α-methylbenzyl) peroxide, and di-α-cumyl peroxide. Examples of other compounds which are capable of generating free radicals when heated, and which therefore come within the broad class of free radical generators, are the azo compounds, amine oxides such as triethylamine oxide, hydrazine salts such as hydrazine hydrochloride, and metal alkyls such as lead tetraethyl. Of all these various free radical generators, di-α-cumyl peroxide has been found to be particularly effective and is in general preferred for use in accordance with the invention.

The proportion of free radical generating compound used will, in general, vary between about 0.1% and 10% by weight of the composition, the optimum proportion depending on the activity of the particular generator employed, the time and temperature of the curing treatment, and the degree of cross-linking desired in the polyethylene-pigment blend. When using organic peroxide free radical generators, it is generally best to employ them in an amount between 0.5% and 5% by weight of the composition. In order to obtain the maximum degree of cross-linking of the polyethylene with itself and with the lithopone or antimony oxide, it is desirable to use such peroxides in an amount only slightly in excess of the quantity theoretically needed, since it is desirable that the final cured product should contain as little free peroxide as possible to prevent deterioration of the electrical properties of the product. For example, highly satisfactory results have been obtained by employing di-α-cumyl peroxide in an amount equivalent to about 1% by weight of the composition. Employing an appreciably higher percentage of di-α-cumyl peroxide results in better initial physical properties of the product, but somewhat poorer aging characteristics.

The polyethylene used according to this invention is the normally solid polymeric material of commerce, formed by the polymerization of ethylene at high temperatures and pressures. Polyethylene having an average molecular weight anywhere in the range from 2000 to 40,000 or higher may be employed, in the practice of the invention. Preferably, however, the proportion of low molecular weight polyethylene (molecular weight below 10,000) is kept low (below 10%) because the production of a composition of maximum thermal stability requires the use mainly of polyethylene having a molecular weight above 10,000. Copolymers of propylene and ethylene posses chemical characteristics very similar to that of polyethylene, and may be used in conjunction or in place of polyethylene for purposes of this invention.

The lithopone used according to this invention comprises barium sulfate and zinc sulfide. Commercial lithopone is prepared as the coprecipitate resulting from mixing solutions containing substantially equimolar proportions of barium sulfide and zinc sulfate, and so contains about 30% zinc sulfide and about 70% barium sulfate. Although the commercial product is eminently suitable for making the compositions of this invention, it is not necessary that the lithopone employed be either a coprecipitate, or contain barium sulfate and zinc sulfide in the above stated proportion. Compositions have been made using a lithopone prepared simply by mixing together separately produced barium sulfate and zinc sulfide. Moreover, the proportions of barium sulfate and zinc sulfide are not critical. Indeed, either of the pigments, barium sulfate or zinc sulfide, may be used alone, or they may be mixed in any desired proportion; and accordingly the term "lithopone" is used herein to denote a pigment consisting essentially of 0 to 100% barium sulfate and 100% to 0 zinc sulfide.

Commercially prepared lithopone often is treated to modify its surface properties and make it easier to disperse in a vehicle or other carrier. Such treatment does not impair its utility for the purpose of this invention.

Antimony oxide is another pigment which may be cross-linked with polyethylene to produce compositions in accordance with this invention. It may be employed in conjunction with or in place of the lithopone. The tensile strength and elongation of freshly cured polyethylene compositions cross-linked with antimony oxide are less than for corresponding compositions made with lithopone, but are high enough to be equally useful. Although any of the antimony oxides may be employed for making compositions according to this nivention, white antimony (III) oxide, $Sb_2O_3$, is preferred. The so-called tetra-oxide, $Sb_2O_4$, is also white, but antimony (V) oxide, $Sb_2O_5$, is of a yellow color and can only be used when a yellow-colored product is not objectionable.

The amount of pigment used in making compositions according to this invention is from about 20% to about 80% by weight of the composition, with, advantageously about 20% to 80% by weight of polyethylene. Preferred compositions contain about equal amounts by weight of polyethylene and pigment. When the amount of pigment employed appreciably exceeds 80% by weight of the mixture, it appears to retard the cross-linking reaction, evidently by imposing restrictions on the movement of the polyethylene radical chains and interfering with direct cross-linking of the polyethylene.

In making the new compositions by the procedure which involves generating free radicals in a blend of polyethylene and pigment by chemical means, the polyethylene, the lithopone or antimony oxide, and a free radical generator are intimately blended together. If desired, the polyethylene and lithopone or antimony oxide may first be blended together, before the free radical generator is blended therein. The blending operation may be accomplished by any convenient technique, on any desired apparatus. For example, the Banbury mixer has been advantageously employed. The temperature at which the materials are blended together depends largely upon the particular free radical generator employed. Generally, the blending temperature in the Banbury mixer is kept under 115° C.; however, higher temperatures may be employed so long as there is no appreciable decomposition of the free radical generator. If desired, the blending may also be acomplished by milling on rolls.

While ordinarily only polyethylene and lithopone or antimony oxide are blended together in making compositions according to the invention, the addition of other ingredients in amounts up to about 20% or so by weight of the composition is not excluded. For example, a coloring agent may be added, or a silicone rubber to improve flexibility.

The blended composition of polyethylene, lithopone or antimony oxide, and free radical generator may be shaped by any convenient means, as by molding, extruding, rolling into sheets, etc. This blend then is cured by heating it to a temperature sufficiently high to decompose the free radical generator, thereby generating free radicals within the blend and thus inducing the polyethylene chains to cross-link with themselves and with the lithopone or antimony oxide. The shaping and cross-linking may be effected simultaneously, if desired, as by molding or extruding at the curing temperature. Curing the blend has been satisfactorily effected in steam in both a flash vulcanizer and a continuous vulcanizer at a pressure of about 200 pounds per square inch (198° C.) for a period of time from about 1 to 15 minutes, the best results being obtained with a curing time of about 5 minutes. Alternatively, the blend may be cured in a molding press at a temperature of at least 135° C. and up to about 250° C., the best results having been obtained (with di-α-cumyl peroxide as the free radical generator) in the range of from 140° C. to 160° C. for a period of about 30 minutes.

The freshly cured product generally contains a little residual peroxide or equivalent free radical generator, even though the amount used is small. This residual may exert a deleterious effect on the properties of the cured composition. Accordingly, it is sometimes desirable to heat the cured product at a temperature above 100° C. for a long enough period to eliminate the final small residual amount of the peroxide or equivalent compound. For example, heating a polyethylene-lithopone composition cured with di-α-cumyl peroxide for about 18 hours at about 120° C. after curing results is substantial improvement in electrical properties of the composition.

When the cross-linking of the polyethylene chains with themselves and the lithopone or antimony oxide is induced by means of high energy radiation instead of by chemical means, the polyethylene and pigment are blended together and molded into sheets or otherwise formed by any of the above-mentioned methods. Subsequently, the blend is cured by subjecting it to high energy gamma or neutron radiation, or both, until the polyethylene has been sufficiently cross-linked with itself and with the pigment blended with it to form a composition of high thermal stability. Any convenient means of producing the desired radiation may be employed, such as a nuclear particle accelerator (cyclotron or the like) or, preferably, a nuclear reactor.

The invention is further illustrated by the following examples, in which the parts are by weight.

*Example I*

One hundred parts of commercial polyethylene having a molecular weight of about 21,000 was intimately mixed together with 100 parts of commercial lithopone (30% zinc sulfide, 70% barium sulfate) and 2 parts of di-α-cumyl peroxide in a Banbury mixer. The resulting blend of these ingredients was then thoroughly milled and taken from the milling rolls in sheet form. The sheets were cured in steam in a flash vulcanizer at a gauge pressure of 200 pounds per square inch (198° C.) for the time periods indicated below:

| Cure Time | Tensile Strength (p.s.i.) | Percent Elongation |
|---|---|---|
| 2.5 min | 1,518 | 480 |
| 5 min | 1,617 | 523 |
| 10 min | 1,752 | 530 |
| 15 min | 1,413 | 463 |

The above tabulation indicates that the preferred curing time is about 5–10 minutes for these lithopone-polyethylene compositions.

The cured sheets, as indicated in the tabulation, were strong and elastic. They were white in color and had a smooth texture and a glossy surface.

They had low specific inductive capacity, a low power factor, and high dielectric strength. (These properties were improved still further by heating, after curing, at 121° C. for 17 hours.) They showed substantial thermal stability at 260° C., in that they could be heated to this temperature for a short period of time (about 15 minutes) without melting or other form of degradation, and without excessive loss of advantageous physical properties.

*Examples II to V*

Additional blends, in accordance with the following formulae, were made in accordance with the foregoing procedure, employing a curing time of 5 minutes under steam at 200 p.s.i. and 198° C., with results as outlined in the tabulation below:

| Example Number | II | III | IV | V |
|---|---|---|---|---|
| Parts by weight of: | | | | |
| Polyethylene (Commercial, M.W. about 21,000) | 100 | 100 | 100 | 100 |
| Lithopone (commercial) | 100 | 100 | 100 | 100 |
| Di-α-cumyl peroxide | 2 | 3 | 4 | 6 |
| Initial Cured Physical Properties: | | | | |
| Tensile Strength (p.s.i.) | 1,617 | 2,110 | 1,815 | 2,136 |
| Elongation (percent) | 523 | 510 | 485 | 400 |
| After aging at 121° C. for 7 Days: | | | | |
| Tensile Strength | 1,919 | 1,660 | 1,580 | -------- |
| Elongation (percent) | 490 | 225 | 200 | -------- |
| After aging at temperature indicated for 15 minutes: | | | | |
| 180° C. tensile strength (p.s.i.) | 1,588 | 1,813 | 2,183 | -------- |
| Elongation (percent) | 460 | 450 | 446 | -------- |
| 200° C. Tensile Strength (p.s.i.) | 1,535 | 1,557 | 1,585 | -------- |
| Elongation (percent) | 93 | 100 | 85 | -------- |
| 220° C. Tensile Strength (p.s.i.) | 1,485 | 1,552 | 1,537 | -------- |
| Elongation (percent) | 67 | 70 | 43 | -------- |
| 240° C. Tensile Strength (p.s.i.) | 1,520 | 1,460 | 1,418 | -------- |
| Elongation (percent) | 73 | 30 | 30 | -------- |
| 260° C. Tensile Strength (p.s.i.) | 1,512 | 1,498 | 1,315 | -------- |
| Elongation (percent) | 70 | 47 | 20 | -------- |

The above tabulation indicates that the preferred amount of di-α-cumyl peroxide to use in these compositions is about two parts by weight based on the polyethylene (1% by weight of the preferred polyethylene-lithopone composition).

*Examples VI to VIII*

Additional blends, in accordance with the following formulae, were made in accordance with the foregoing procedure, employing a curing time of 5 minutes under steam at 200 p.s.i. and 198° C., with the results outlined in the tabulation below:

| Example Number | VI | VII | VIII |
|---|---|---|---|
| Parts by weight of: | | | |
| Polyethylene (commercial, M.W. about 21,000) | 100 | 100 | 100 |
| Lithopone (commercial) | 100 | 200 | 300 |
| Di-α-cumyl Peroxide | 2 | 4 | 7.5 |
| Uncured Physical Properties: | | | |
| Tensile Strength (p.s.i.) | 1,561 | 1,689 | 1,412 |
| Elongation (percent) | 60 | 24 | 12 |
| Initial Cured Physical Properties: | | | |
| Tensile Strength (p.s.i.) | 1,617 | 1,263 | 1,236 |
| Elongation (percent) | 523 | 385 | 18 |

The above table indicates that about equal proportions by weight of polyethylene and lithopone are the preferred proportions to use in these compositions.

*Example IX*

A blend in accordance with the following formula was made in accordance with the foregoing procedure, employing a curing time of 5 minutes under steam at 200 p.s.i. and 198° C., with the results as outlined in the tabulation below:

Example Number IX:
    Parts by weight of:
        Polyethylene (commercial, M.W. about 21,000) _____ 100
        Antimony oxide ($Sb_2O_3$) _____ 100
        Di-α-cumyl peroxide _____ 2
    Initial cured physical properties:
        Tensile strength (p.s.i.) _____ 1380
        Elongation (percent) _____ 383
    After aging at 121° C. for 7 days:
        Tensile strength (p.s.i.) _____ 1650
        Elongation (percent) _____ 490

The above table indicates that antimony oxide may be used in these compositions to produce thermally stable polyethylene compositions.

It is to be understood that the embodiments of the invention specifically set forth in the foregoing examples are only illustrative of, and do not impose any limitation upon, the scope of the invention.

I claim:
1. The process of preparing a composition of polyethylene and a pigment of the group consisting of lithopone and antimony oxide in which the polyethylene chains are cross-linked both with themselves and with said pigment which comprises intimately mixing together from about 20% to about 80% by weight of polyethylene, correspondingly from about 20% to about 80% by weight of said pigment, and from about 0.5% to about 5% by weight of an organic free radical generating peroxide, and heating the resulting mixture to a temperature above the decomposition temperature of said peroxide, whereby free radicals are generated within the mixture and cross-linking of the polyethylene chains both with themselves and with the pigment ensues and a composition which is thermally stable for a substantial period of time at 260° C. is produced.

2. The process of preparing a composition of polyethylene and a pigment of the group consisting of lithopone and antimony oxide in which the polyethylene chains are cross-linked both with themselves and with said pigment which comprises intimately mixing together from about 20% to about 80% by weight of polyethylene, correspondingly from about 20% to about 80% by weight of lithopone, and from about 0.5% to about 5% by weight of an organic free radical generating peroxide, heating the resulting mixture to a temperature above the decomposition temperature of said peroxide, whereby free radicals are generated within the mixture and cross-linking of the polyethylene chains both with themselves and with the pigment ensues and a composition which is thermally stable for a substantial period of time at 260° C. is produced, and heating the cross-linked product at a temperature above 100° C. until residual peroxide is substantially completely eliminated, whereby electrical properties of the composition are improved.

3. The process of preparing a composition of polyethylene and lithopone in which the polyethylene chains are cross-linked with themselves and with the lithopone, which comprises preparing a mixture containing approximately equal proportions by weight of polyethylene and lithopone and containing about 1% by weight of di-α-cumyl peroxide, and heating said mixture to a temperature above the decomposition temperature of said peroxide, whereby free radicals are generated within the mixture and cross-linking of the polyethylene chains both with themselves and with the lithopone enuses and a composition characterized by substantial thermal stability at 260° C. is produced.

References Cited by the Examiner

UNITED STATES PATENTS

| 2,480,298 | 8/49 | Hoppoldt | 260—41 |
| 2,561,063 | 7/51 | McBurney et al. | 260—41 |
| 2,628,214 | 2/53 | Pinkney et al. | 260—41 |
| 2,830,919 | 4/58 | Schatzel | 260—41 |
| 2,876,133 | 3/59 | Iler et al. | 260—41 |
| 2,888,424 | 5/59 | Precopio et al. | 260—41 |
| 2,997,452 | 8/61 | Makowski et al. | 260—41 |

OTHER REFERENCES

Bostwick et al: Industrial and Engineering Chem., volume 42 (1950), pages 848–849.

MORRIS LIEBMAN, *Primary Examiner.*

DANIEL ARNOLD, LEON J. BERCOVITZ, ALEXANDER H. BRODMERKEL, *Examiners.*